United States Patent

Laun, III

[15] 3,703,317

[45] Nov. 21, 1972

[54] VEHICLE WHEEL AND BRAKE WITH HEAT SHIELD

[72] Inventor: Charles L. Laun, III, Akron, Ohio

[73] Assignee: The Goodyear Tire & Rubber Company, Akron, Ohio

[22] Filed: Nov. 2, 1970

[21] Appl. No.: 85,998

[52] U.S. Cl. ............................. 301/6 R, 188/264 G
[51] Int. Cl. ............................................. B60b 19/00
[58] Field of Search ...... 188/264 G; 301/6 WB, 6 CS, 301/6 E, 6 R

[56] References Cited

UNITED STATES PATENTS

| 3,061,050 | 10/1962 | Van Horn | 188/264 G |
| 3,051,528 | 8/1962 | Rogers | 188/264 G |
| 2,003,109 | 5/1935 | Farr | 301/6 WB |
| 2,801,714 | 8/1957 | Dotto | 188/264 G |
| 3,035,667 | 5/1962 | Macthaner | 188/264 G X |
| 2,389,311 | 11/1945 | Hirschman et al. | 188/264 G |
| 2,065,088 | 12/1936 | Mueller | 188/264 G |
| 2,267,263 | 12/1941 | Berger | 188/264 G |
| 3,503,475 | 3/1970 | Mione | 188/264 G X |

FOREIGN PATENTS OR APPLICATIONS

| 469,292 | 7/1937 | Great Britain | 188/264 G |
| 280,920 | 6/1928 | Great Britain | 301/6 E X |

OTHER PUBLICATIONS

Advertising Bulletin from Motor Wheels Corporation, Lansing, Michigan 48914 entitled "Exiter", printed 3/1970.

*Primary Examiner*—Robert J. Spar
*Attorney*—F. W. Brunner and Paul E. Milliken

[57] ABSTRACT

A heat shield coating on the surface of a wheel opposite form the tire bead seat surface and adjacent to the brake assembly to limit heat transmission into the wheel and then through the wheel into the bead of a tire mounted on the wheel. The heat shield coating can also be used on the outside surface of the brake housing to limit heat transmission into the housing. The heat shield coating can also be used on the outside surface of the brake assembly to limit heat transmission from the brake assembly.

4 Claims, 2 Drawing Figures

PATENTED NOV 21 1972 3,703,317

INVENTOR.
CHARLES L. LAUN, III
BY
*A.M.Milliken*
ATTORNEY

VEHICLE WHEEL AND BRAKE WITH HEAT SHIELD

This invention relates to a heat shield coating for use on vehicle wheels, brake housings and brake assemblies to prevent undesirable heat from the brake from passing into the wheel or into the brake housing. This is particularly useful on racing cars and earthmover vehicles but may be useful on other types of vehicles.

PRIOR ART

The closest known prior art to this application are U.S. Pat. Nos. 3,448,783 and 3,504,725. Both these patents show a heat insulating shield located between a tire bead and the bead seat of a wheel rim.

OBJECTS OF THE INVENTION

A primary object of this invention is to provide a means to limit the transmission of heat generated by a brake into the wheel rim and into the brake housing where such heat may cause damage to the wheel, the tire bead or such internal parts of the housing as the brake piston by using a thermal barrier coating which may be easily applied to surfaces of a wheel and/or a brake assembly.

It is a further object of this invention to provide a means to limit overheating of hydraulic fluid in the brake cylinder.

Another object of this invention is to provide a means to limit heat transmission through the wheel in the area of the tire bead seat to prevent damage to the tire bead by overheating.

These and other objects of the invention will become more fully apparent in the following specification and the accompanying drawings.

DESCRIPTION OF THE PREFERRED EMBODIMENTS

Figure 1:
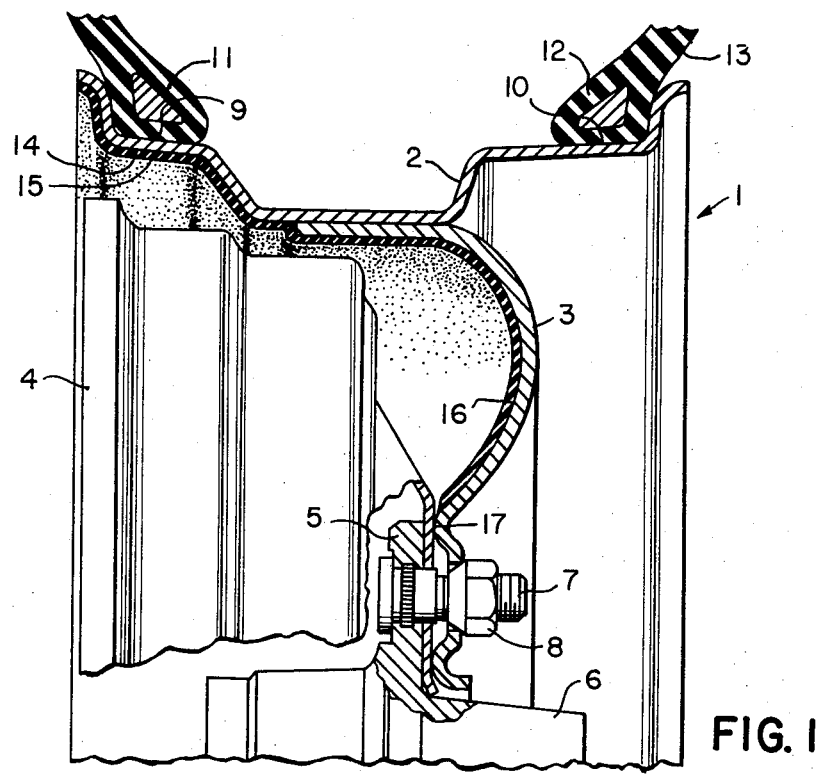
FIG. 1 shows a fragmentary cross-sectional view through a typical wheel and drum brake assembly with a tire mounted thereon.

Referring now to FIG. 1, a vehicle wheel indicated generally by the numeral 1 has a conventional drop center type rim 2 attached to a center web 3 which is bolted along with a brake drum 4 to a flange 5 of a hub 6 by a plurality of bolts 7 with nuts 8 thereon. Since the wheel and brake are the conventional type of brake used on an automotive vehicle, they will not be described in further detail except to say that located inside the brake drum 4 is the conventional brake mechanism including brake shoes and actuating piston which are all well-known in the prior art. The wheel rim 2 has radially outwardly facing bead seats 9 and 10 which respectively receive tire beads 11 and 12 of a pneumatic tire 13.

It is well known that in a vehicle when the brakes are applied for any extended period of time and particularly at high speeds, the friction of the brake shoes rubbing against the brake drum generates heat which is transmitted outwardly through the brake drum and into the vehicle wheel where it may cause damage to the wheel or to the tire beads of tires mounted upon the wheel. In racing cars, for example, the brakes may reach temperatures above 600° F during a race.

As shown in FIG. 1, a heat shield coating which is made of a material which is non-conductive of heat is applied to the radially inner surface 15 of the wheel rim 2 and on the axially inner surface of the web 3 adjacent the brake drum 4. In the embodiment shown in FIG. 1, the heat shield coating 14 is not applied to the web 3 where it is in contact with the brake drum 4. This provides a good seating surface 17 between the web 3 and the brake drum 4 so that when the nuts 8 are tightened on the bolts 7, the web 3 will be held securely against the drum 4 and the wheel and brake drum will not wobble with respect to the hub 6.

Although various non-heat conductive materials may be used for the coating 14, one preferred material is a silicone rubber compound made by the Silicone Products Department of General Electric under the code name of TBS–758. This material may be troweled on to the desired surface of the wheel or brake housing or may be applied in other ways and then can be cured in place at temperatures ranging between ordinary room temperature and 300° F, depending upon the amount of curing time which is used and thickness of material. In a thermal barrier temperature test, a ¼ inch thick coating of TBS–758 was placed on a surface and exposed to a temperature of 5,000° F. In 60 seconds the backside temperature rose only 82°.

The advantage of applying the coating 14 to the radially inner surface of the wheel rim 2 rather than to the outer surface of the tire bead seat as is known in the prior art, is that the coating will protect not only the tire bead from excess heat but will also prevent excess heat from being transmitted into the wheel rim. Furthermore, if a heat shield is placed directly between a tire bead and a bead seat, it can create problems in maintaining a proper seal between the tire and the rim when a tool is used to change a tire, the tool may damage any heat shield located in the area of the bead seat. By placing the coating on the opposite side of the rim from the bead seat and adjacent the brake, it not only is in a position where it will not be damaged during the changing of a tire, but it will limit the transmission of heat by radiation and/or convection from the brake assembly into the wheel, thereby limiting the heat conducted through the wall into the tire bead. There may be some instances where it is not necessary to coat the entire inner surface of the wheel adjacent the brake as is illustrated in FIG. 1. The invention, therefore, should not be considered as limited to coating any specific area of the inner surface of the wheel but rather to coating either all or part of the inner surface of the wheel, depending upon the particular wheel and brake assembly in which the heat shield is being used.

Figure 2:
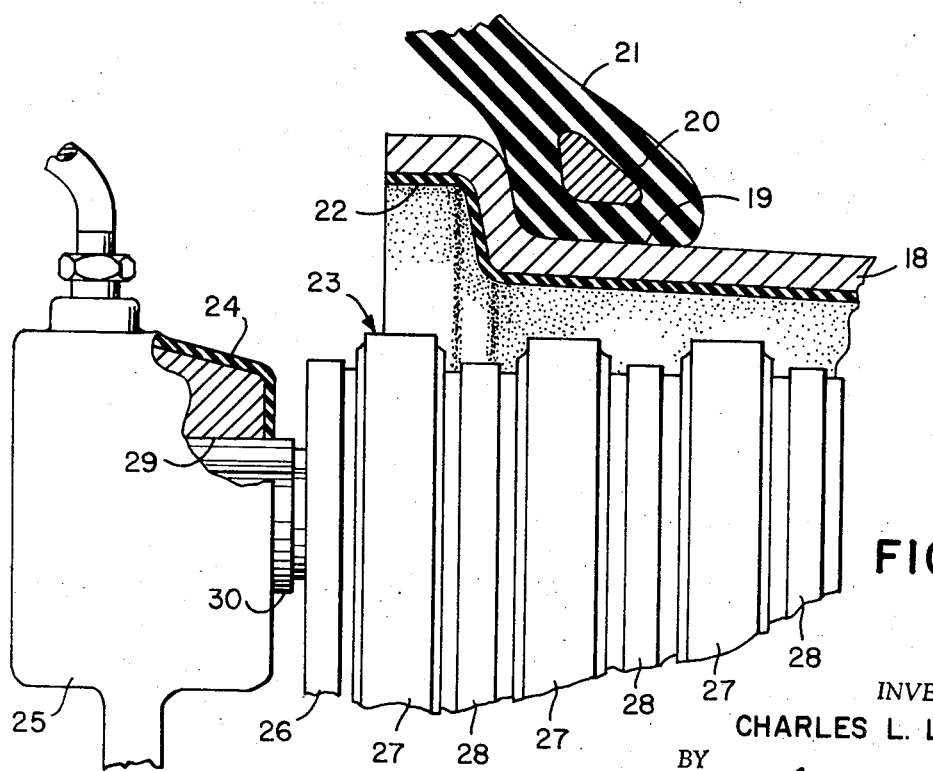
FIG. 2 shows a fragmentary cross-sectional view of a portion of a wheel and disc brake assembly with a tire mounted on the wheel.

The heat shield coating of this invention can also be used on a disc-type brake as shown in FIG. 2 in which a wheel rim 18 has a bead seat surface 19 for receiving a tire bead 20 of a tire 21. A heat shield coating 22 is positioned on the radially inner surface of the wheel 18 which is opposite the bead seat surface 19 to limit the transmission of heat from a stack 23 of brake discs into the wheel 18 and the tire bead 20. A heat shield coating 24, similar to the coating 22 on the wheel 18, is applied to the outer surface of a brake housing 25.

The disc brake stack 23 is the conventional type which is often used in standard multi-disc brake assemblies having a pressure plate 26, a plurality of rotary discs 27 and a plurality of stationary discs 28 interleaved between the rotary discs 27. The rotary discs 27 are keyed to the wheel 18 and rotate therewith and the stationary discs are keyed to a fixed axle which is not shown herein for the purpose of simplicity. The brake housing 25 is fixed to a stationary hub or axle, (not shown) which is well-known in the prior art. The housing 25 contains a hydraulic cylinder 29 which carries an axially movable piston 30 which in turn bears against the pressure plate 26 when the brake is actuated. Since the specific brake structure does not form a part of the invention it will not be described in further detail for the sake of simplicity. Suffice it to say that the present invention can be used with any single or multiple disc brake as well as with the drum brake illustrated in FIG. 1. It should be understood that in any brake structure, the heat shield coating may be used either on the radially inner surface of the wheel as in the case of the coating 22 or on the outer surface of the brake housing as in the case of the coating 24 or the coating may be used simultaneously on both the wheel and the brake housing depending upon the needs of the particular wheel and brake assembly with which the coating is being used. The heat shield coating may in some applications be applied to the outer surface of a brake drum or other parts of the brake assembly in either a drum or disc-type brake. The coating 22 on the wheel 18 performs the same function as the coating 14 on the wheel 1 in FIG. 1 since it limits heat transmission from the brake into the wheel and then into the tire bead 20. The coating 22 thereby serves a dual purpose in eliminating undesirable high temperatures both in the wheel rim and in the tire bead. The coating 24 on the outside of the housing 25 helps to prevent overheating of the housing and in turn, prevents overheating of the hydraulic brake fluid and of the various working parts within the housing. Such heat shielding coating will therefore aid in preventing premature failure of the working parts of the brake housing and when used on the wheel of various parts of the brake assembly, will serve to prolong the useful life of both the wheel and the tire mounted thereon. While one of the preferred coating materials was previously identified herein as a silicone rubber compound, it will be obvious that other materials may be used so long as they have the desired properties for preventing heat transmission in the particular type of brake in which the shielding coating is being used. It should also be understood that the coating may be applied to all of the surfaces described herein or to any parts thereof and that various other modifications may be made in the composition of the heat shielding coating or the placement thereof without departing from the scope of the invention.

What is claimed is:

1. A vehicle wheel and brake assembly comprising:
   A. a wheel having a rim with tire bead seat surfaces;
   B. a pneumatic tire having beads mounted thereon in contact with the bead seat surfaces;
   C. a brake means mounted adjacent to at least one axial side of the wheel;
   D. a heat transmission barrier coating permanently adhered in intimate contact with substantially the entire surface of the wheel on the side adjacent the brake means to limit the amount of heat transmitted from the brake into the wheel; and
   E. wherein the wheel has a rim portion and a web portion with the heat transmission barrier covering substantially all of the rim surface on one side of the web portion and substantially all of the surface of one side of the web portion.

2. The assembly claimed in claim 1 wherein the transmission barrier coating is comprised of a silicone rubber compound.

3. A vehicle wheel as claimed in claim 1 wherein the heat transmission barrier coating is a radiation reflective material.

4. A wheel and brake assembly comprising:
   A. a vehicle wheel having a pneumatic tire thereon;
   B. a brake assembly having a brake housing and a disc stack mounted adjacent to the wheel; and
   C. a heat transmission barrier coating permanently adhered in intimate contact with substantially the entire outer surface of the brake housing;
   D. said barrier coating limiting the amount of heat passing from the disc stack into the housing, and wherein both the outer surface of the brake housing and a surface of the wheel adjacent the brake assembly are coated with the heat transmission barrier coating.

* * * * *